United States Patent
Bartolini et al.

(10) Patent No.: US 9,157,033 B2
(45) Date of Patent: Oct. 13, 2015

(54) PROCESS FOR RECOVERING METALS FROM A STREAM RICH IN HYDROCARBONS AND CARBONACEOUS RESIDUES

(75) Inventors: Andrea Bartolini, San Giuliano Milanese (IT); Paolo Pollesel, San Donato Milanese (IT); Emilio Sentimenti, Carbonera (IT); Michele Checchin, Preganziol (IT)

(73) Assignee: ENI S.p.A., Rome (IT)

( * ) Notice: Subject to any disclaimer, the term of this patent is extended or adjusted under 35 U.S.C. 154(b) by 322 days.

(21) Appl. No.: 13/516,045

(22) PCT Filed: Dec. 13, 2010

(86) PCT No.: PCT/EP2010/007627
§ 371 (c)(1),
(2), (4) Date: Jul. 24, 2012

(87) PCT Pub. No.: WO2011/072841
PCT Pub. Date: Jun. 23, 2011

(65) Prior Publication Data
US 2012/0279358 A1 Nov. 8, 2012

(30) Foreign Application Priority Data
Dec. 14, 2009 (IT) .............................. MI2009A2182

(51) Int. Cl.
*C10G 21/06* (2006.01)
*C10G 21/28* (2006.01)
(Continued)

(52) U.S. Cl.
CPC ................ *C10G 21/06* (2013.01); *C10G 21/28* (2013.01); *C22B 3/22* (2013.01); *C22B 7/008* (2013.01);
(Continued)

(58) Field of Classification Search
CPC .......... C01G 21/06; C01G 21/28; C22B 3/22; C22B 7/009; C22B 7/008
USPC ..................... 75/743, 419; 210/634
See application file for complete search history.

(56) References Cited

U.S. PATENT DOCUMENTS 4,670,229 A * 6/1987 Wiewiorowski et al. ....... 423/55
2009/0136399 A1* 5/2009 Bhaduri ......................... 423/56
(Continued)

FOREIGN PATENT DOCUMENTS

WO 99 58732 11/1999

OTHER PUBLICATIONS

Alkaline. (n.d.). Dictionary.com Unabridged. Retrieved Jul. 7, 2014, from Dictionary.com website: http://dictionary.reference.com/browse/alkaline.*
(Continued)

*Primary Examiner* — George Wyszomierski
*Assistant Examiner* — Tima M McGuthry Banks
(74) *Attorney, Agent, or Firm* — Oblon, McClelland, Maier & Neustadt, L.L.P.

(57) ABSTRACT

A process for recovering metals from a stream containing hydrocarbons and carbonaceous residues comprising sending the stream for extraction by mixing the stream with a hydrophilizing agent to remove the hydrophobic components of the stream, sending the mixture of the stream and hydrophilizing agent for separation, separating a liquid phase containing most of the hydrophilizing agent and hydrocarbons dissolved from a solid phase, sending the separated solid phase for leaching with an alkaline solution in the presence of air and/or oxygen, sending the leached mixture for separation, and separating the solid residue from the liquor.

13 Claims, 3 Drawing Sheets

Figure 1:
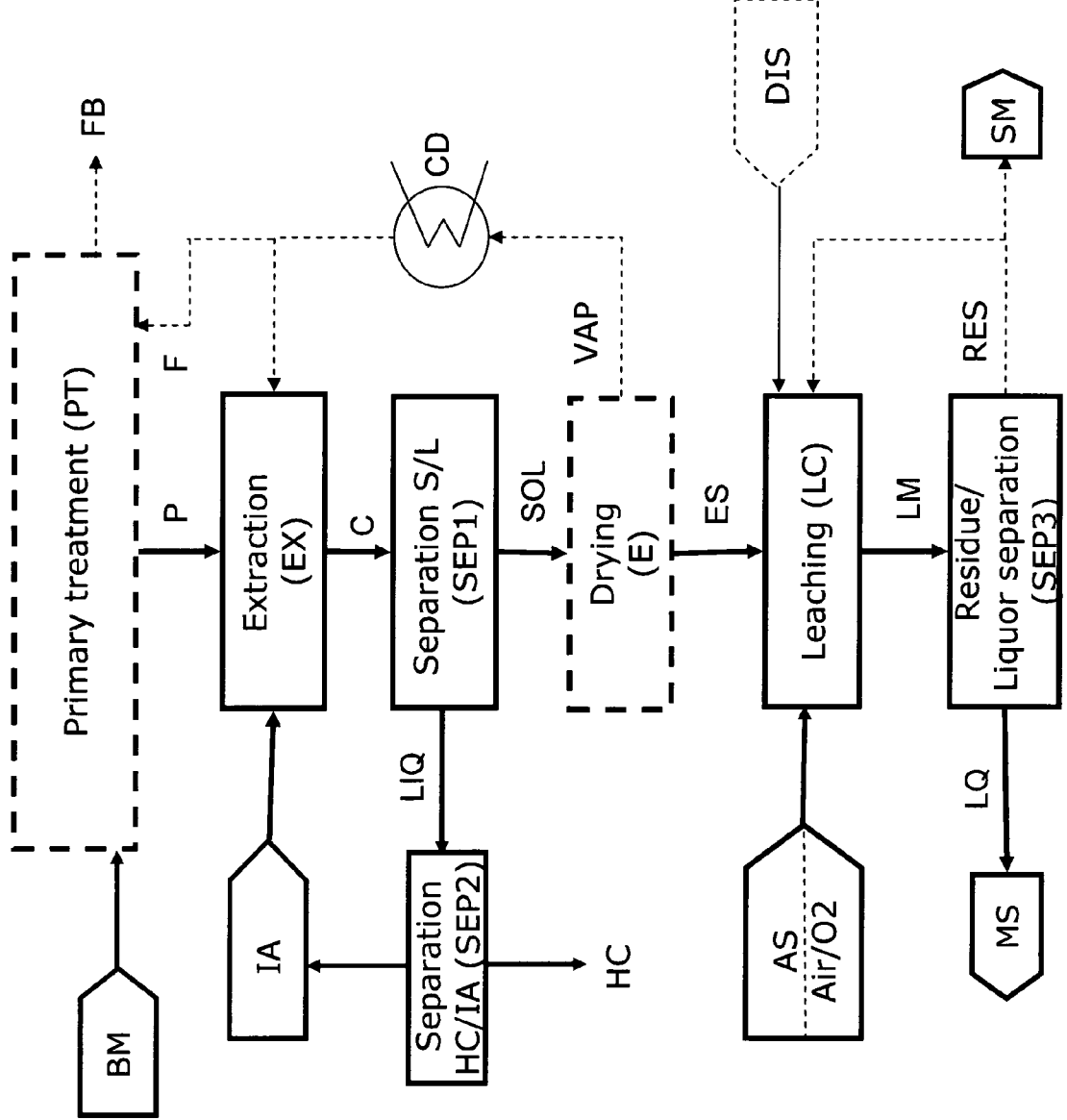

(51) Int. Cl.
  *C22B 3/22* (2006.01)
  *C22B 7/00* (2006.01)
  *C22B 23/02* (2006.01)
  *C22B 34/22* (2006.01)

(52) U.S. Cl.
  CPC ............... *C22B 7/009* (2013.01); *C22B 23/026* (2013.01); *C22B 34/225* (2013.01); *C10G 2300/205* (2013.01); *Y02W 30/54* (2015.05)

(56) References Cited

U.S. PATENT DOCUMENTS

2009/0159491 A1* 6/2009 Lopez et al. ............... 208/45
2012/0134899 A1   5/2012 Bartolini et al.
2013/0247406 A1* 9/2013 Odueyungbo ............... 34/108

OTHER PUBLICATIONS

"Bases—PH Values." Bases—PH Values. The Engineering Toolbox, Feb. 2006. Web. Jul. 7, 2014. <http://www.engineeringtoolbox.com/bases-ph-d_402.html>.*
Extracts (petroleum), Heavy Naphtha Solvent. European Chemicals Agency, 2007. Web. Jul. 7, 2014. <http://apps.echa.europa.eu/registered/data/dossiers/DISS-9fe4a2cd-4fb8-06d0-e044-00144f67d031/AGGR-dedd664d-7c7a-431b-bedb-5cOad40cca8e_DISS-9fe4a2cd-4fb8-06d0-e044-00144f67d031.html>.*
International Search Report Issued Feb. 4, 2011 in PCT/EP10/07627 Filed Dec. 13, 2010.
Qualità Dizionario italiano-inglese at http://www.wordreference.com/iten/qualità accessed May 21, 2015 (1 p.).
Namely—Dizionario inglese-italiano at http://www.wordreference.com/enit/namely—accessed May 21, 2015 (1 p.).

* cited by examiner

PROCESS FOR RECOVERING METALS FROM A STREAM RICH IN HYDROCARBONS AND CARBONACEOUS RESIDUES

The present invention relates to a process for recovering metals from a stream rich in hydrocarbons and carbonaceous residues, wherein the metals can be dispersed in the form of aggregates having dimensions substantially lower than a millimeter, such as for example in purge streams from hydrotreatment processes in slurry phase.

Various processes for the conversion of heavy feedstocks, such as crude oils, heavy and extra-heavy, and distillation residues from crude oil, by hydrotreatment in slurry phase, are known in patent literature.

Some processes comprise the combined use of three process units: hydrotreatment with catalysts in slurry phase of the heavy feedstock, distillation or flash of the product leaving the hydrotreatment, deasphaltation in the presence of solvents of the distillation residue or liquid leaving the flash unit containing the catalyst in dispersed phase, rich in metallic sulfides produced by demetallation of the feedstock and possibly coke (IT-MI95A1095; IT-MI2001A001438; IT-MI2004A2446).

In the processes described above, it is generally necessary to effect a purge to prevent compounds such as sulfides of the metals present in the starting feedstock from accumulating excessively in the hydrotreatment reactor, which can be effected according to the process on the asphaltene stream leaving the deasphaltation section or on the distillation residue or liquid leaving the flash unit.

In order to significantly reduce the amount and enable at least part of the catalyst, which is still active, to be recycled to the hydrotreatment reactor, patent application IT-MI2003A000693 proposes the insertion of a secondary post-treatment section of the purge stream.

In this patent application, the purge stream is sent to a treatment section with a suitable solvent for the separation of the product into a solid fraction and a liquid fraction from which said solvent can be subsequently removed.

The treatment section of the purge effluent, preferably in a quantity ranging from 0.5 to 10% by volume with respect to the fresh feedstock, consists in a de-oiling step with a solvent (toluene or gas oil or other streams rich in aromatic compounds) and a separation of the solid fraction from the liquid fraction.

The solid fraction can be disposed of as such or, more advantageously, can be sent to a selective recovery treatment of the transition metal or metals contained in the transition catalyst (for example Mo) with respect to the other metals present in the starting residue (for example Ni and V), so as to effect the possible recycling of the stream rich in the transition metal (Mo) to the hydrotreatment reactor.

The de-oiling step consists in the treatment of the purge stream, which represents a minimum fraction of the asphaltene stream coming from the deasphaltation section (SDA) to the primary hydrotreatment plant of the heavy feedstock, with a solvent which is capable of bringing the highest possible quantity of organic compounds to liquid phase, leaving the metal sulfides, coke and more refractory carbonaceous residues (toluene-insoluble or similar products) in solid phase.

After the mixing phase between the solvent and purge stream has been completed, the effluent, maintained under stirring, is sent to a separation section of the liquid phase from the solid phase, for example by decanting, centrifugation or filtration.

The liquid phase can then be sent to a stripping or recovery phase of the solvent, which is recycled to the first treatment step (de-oiling) of the purge stream, or it can be recycled to the hydrotreatment reactor.

Other recent patent applications (IT-MI2007A1045, IT-MI2007A1044) on the hydroconversion of heavy oils describe processes which comprise sending the heavy oil to a hydrotreatment step effected in a suitable solid accumulation reactor with a hydrogenation catalyst in slurry phase, into which hydrogen is introduced, obtaining the conversion products in vapour phase and in which the solids supplied and generated by the heavy oils to be converted are removed by purge.

Another recent patent application (IT-MI2007A1198) on the hydroconversion of heavy oils describes a process which comprises sending the heavy oil to a hydroconversion section effected in one or more ebullated bed reactors into which hydrogen is introduced in the presence of both a suitable hydroconversion, heterogeneous, supported catalyst and a suitable hydrogenation catalyst nano-dispersed in the heavy oil and sending the effluent stream from the hydroconversion area to a separation section in which the liquid fraction separated, containing the nano-dispersed catalyst, is recycled to the ebullated bed reactors except for a purge.

Also in these recent applications, a purge is always necessary to prevent the above compounds from accumulating excessively in the hydrotreatment reactor.

In all of the processes mentioned above, the amounts of the purge stream, although extremely limited with respect to other hydrotreatment technologies, in any case create considerable problems relating to their use or disposal.

It has now been found that the purge streams of hydrotreatment processes in slurry phase, of which some have been described above, can be treated by means of a process which comprises at least one extraction with a hydrophilizing agent and a subsequent leaching with an alkaline solution, in this way obtaining a final product, essentially consisting inorganic soluble species, suitable for a selective recovery of the metallic components.

The process claimed also allows the treatment of feedstocks containing significant quantities of metals, thus avoiding problems such as the formation of volatile compounds, for example molybdenum oxide (VI), which can arise in oxidation processes under heating.

The strategic advantage consists in the recovery and re-use of the active principle of the process catalyst.

Large quantities of valuable metals such as, for example, nickel and vanadium, which are used in the metallurgical industry, are also recovered.

Finally, the primary treatment makes quantities of hydrocarbons re-available for the process, which would otherwise be sent for disposal, thus significantly reducing the volume of bitumens to be disposed of and at the same time increasing the overall yield of the hydrotreatment process.

The process, object of the present invention, for recovering metals from a stream rich in hydrocarbons and carbonaceous residues by means of a treatment section is characterized in that it comprises the following steps:
  sending said stream to an extraction by mixing said stream with a suitable hydrophilizing agent, namely being capable of removing the hydrophobic species of said stream;
  sending the mixture consisting of said stream and said hydrophilizing agent to separation, separating a liquid phase containing most of the hydrophilizing agent and hydrocarbons dissolved from a "solid" phase;

preferably subjecting the "solid" phase separated to drying effected at a maximum temperature of 350° C. in order to remove the medium-light hydrocarbon components from the "solid" phase;

sending the "solid" phase separated, preferably dried, to leaching with an alkaline solution in the presence of air and/or oxygen and possibly in the presence of an emulsifying agent or its precursor;

sending the leached mixture to separation, separating the solid residue from the liquor.

The solid residue can either be disposed of or treated to recover the non-leached metals present.

The liquor can be treated to recover the metals. In the case of the presence of molybdenum and vanadium in the liquor, for example, the process claimed in patent application IT-MI2001A001111 can be used.

The streams to be treated, such as purge streams, can generally be bituminous mixtures consisting, for example, of:

Solids (i.e. components not soluble in tetrahydrofuran);
Metallic species (prevalently sulfides of Ni, V, Fe, Mo, Cr);
Carbonaceous residues;
Liquids (i.e. components soluble in tetrahydrofuran);
Hydrocarbons (substantially with a boiling point higher than 170° C.)
Asphaltenes
Sulfur-containing organic species
Nitrogen-containing organic species The stream rich in hydrocarbons and in carbonaceous residues, before being sent to the extraction step, can possibly be sent to a primary treatment, effected in one or more steps, wherein said stream is treated in the presence of a fluxing agent in a suitable apparatus at a temperature ranging from 80 to 180° C., preferably from 100 to 160° C., and subjected to liquid/solid separation in order to obtain a clarified product substantially consisting of liquids and a phase rich in solids (cake or panel) sent to said extraction step.

The fluxing agent, whose function is to:
reduce the content of asphaltenes associated with the cake phase by means of simple mixing
reduce the viscosity of the stream sent for enrichment of the "solids" in the cake phase, is preferably selected among the streams available in the plant which have a pour point lower than 180° C., for example VGO (Vacuum Gas Oil) and LCO (Light Cycle Oil).

The primary treatment step, which is effected with the purpose of:
reducing the weight of the "liquids" associated with the "solids" by a factor of at least 2
maintaining at least 80% of the solids in the cake phase, can be effected in a single step or in various steps, preferably from 2 to 5.

An advantage of the multistep treatment is a more marked reduction in the content of asphaltenes and hydrocarbons with a boiling point higher than 300° C. in the cake phase and a more easily transportable cake.

In the case of a single step, the fluxing agent is preferably fed in cocurrent with respect to the stream to be treated.

In the case of various steps, the fluxing agent is preferably fed in countercurrent with respect to the stream to be treated, as, in each step, the solid separated in the separation is sent to the subsequent treatment step, the liquid separated in the separation is recycled, as fluxing agent, to the previous treatment step.

This primary treatment is effected in apparatuses which allow separation by means of physical treatment based on the different liquid-solid density/dimensions, such as, in particular, filter-presses, centrifuges, decanter centrifuges and hydrocyclones. The decanter centrifuge is the preferred apparatus.

In the case of more than one step, the apparatuses can be different, it being preferable, however, to use a decanter centrifuge in the first step.

The optional drying step is aimed at removing the hydrocarbon fraction from the "solid" phase, minimizing the entity of the thermal cracking.

It is preferably carried out by moving said final "solid" phase under heat and in an inert atmosphere, at temperatures preferably up to 350° C., more preferably up to 280° C., and pressures preferably of 1 bar or under vacuum up to 0.05 bar, and in a possible fluxing of inert gas (for example nitrogen).

Among the advantages of the drying operation is the formation of an end-product which can be easily transported and stored.

The hydrophilizing agent can preferably be selected from tetrahydrofuran, furfurol, n-methyl-2-pyrrolidone, isobutanol, piperidine, pyrrolidine, pyridine, methyl-tetrahydrofuran, diglyme, LCO and VGO, more preferably from tetrahydrofuran and methyl-2-pyrrolidone.

The hydrophilizing agent is preferably at least partially soluble in aqueous phase.

The liquid phase containing most of the hydrophilizing agent and dissolved hydrocarbons can preferably be subjected to separation, separating the hydrophilizing agent, which is recycled to the extraction step, from the hydrocarbons.

The leaching step can be effected preferably operating at temperatures ranging from 50 to 250° C. and pressures ranging from atmospheric pressure to 100 bar.

The alkaline metal in solution can preferably be selected from sodium and potassium with a concentration preferably ranging from 0.3 to 2 g/g solid.

This leaching step is possibly carried out in the presence of a dispersing agent or its precursor.

The vapours leaving the drying step can be condensed and recycled to the extraction step or they can be sent to the torch.

Some embodiments of the present invention are now provided with the help of the enclosed figures which however should not be considered as limiting the scope of the invention itself.

In FIG. 1, the process object of the present invention is schematized.

The bituminous mixture (BM) is preferably subjected to a primary treatment (PT) in the presence of a fluxing agent (F) thus separating a substantially liquid stream (the clarified product) (FB), the fluxed bitumen (to be recycled to the hydrotreatment unit), and a phase rich in solids (P).

The phase rich in solids (P) is sent to the extraction step (EX) effected by mixing said phase rich in solids with a hydrophilizing agent (IA) so as to dissolve part of the hydrocarbons present in the same phase, in the hydrophilizing agent itself.

The mixture (C) thus obtained is sent to a separation step (SEP1) obtaining a liquid phase (LIQ) containing most of the hydrophilizing agent and hydrocarbons dissolved from a "solid" phase (SOL).

The liquid phase (LIQ) is subjected to separation (SEP2) separating the hydrocarbons (HC) from the hydrophilizing agent (IA) which is recycled to the extraction step (EX).

The "solid" phase (SOL) separated is preferably subjected to a drying step (E) in order to remove the components having a boiling point lower than a temperature ranging from 300 to 350° C. from the "solid" phase.

The hydrocarbons with a boiling point lower than 300-350° C. (VAP) are recovered by drying and, after being condensed in the condenser (CD), can be recycled to the extraction step (EX) and/or form a fluxing make-up (F) and/or be destined for other uses in the refinery and/or be sent to a flare.

The "solid" phase separated (ES), possibly dried, is subjected to leaching (LC) with an alkaline solution (AS), in the presence of air and/or oxygen and possibly in the presence of a dispersing agent (DIS).

The leached mixture (LM) is sent to a further separation step (SEP3) separating the solid residue (RES), to be subjected to disposal or to be treated (SM), from the liquor (LQ), to be subjected to treatment (MS).

Figure 2:
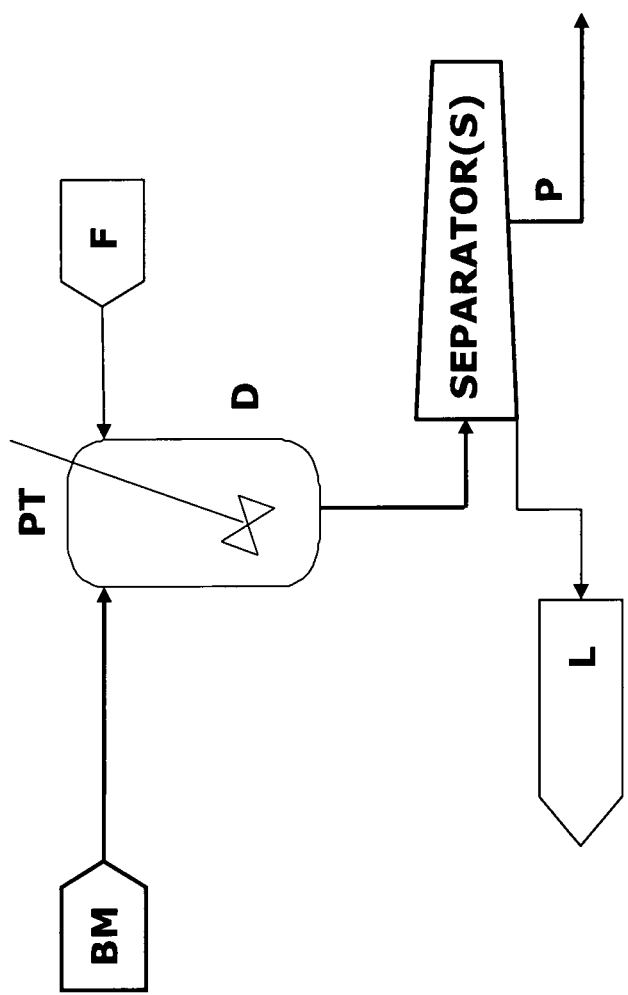

In FIG. 2, the primary treatment effected with a single step is schematized.

The bituminous mixture (BM) is subjected to primary treatment (PT) in suitable equipment (for example a centrifuge decanter (S)), after mixing in a suitable stirred vessel (D) with a fluxing agent (F) in cocurrent with respect to the bituminous mixture, separating it in the separator (S) into a liquid (L), the clarified product, in which small quantities of solids can be present, and into a phase rich in solids (P).

Figure 3:
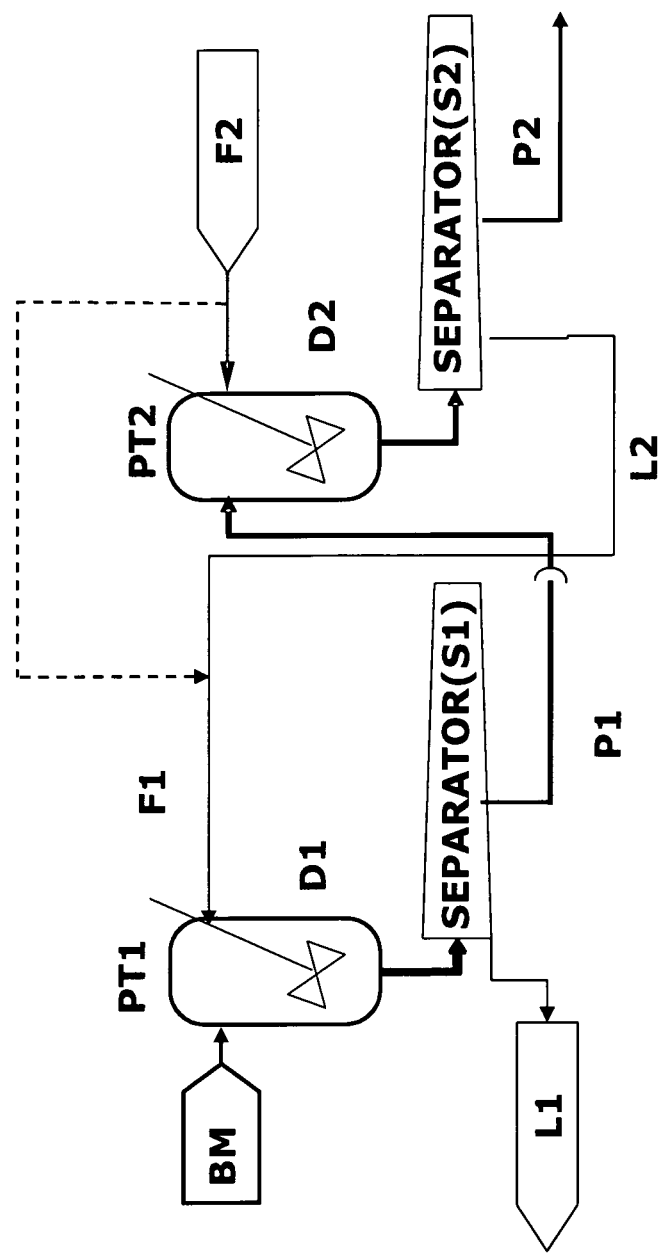

In FIG. 3, the primary treatment effected in multistep (2 steps) is schematized.

The bituminous mixture (BM) is subjected to a first primary treatment step (PT1) in a suitable apparatus (for example a decanter centrifuge (S1)) with a fluxing agent (F1), separating it in the separator (S1) into a liquid (L1), the final clarified product, and into an intermediate phase rich in solids (P1), which is sent to the second step of the primary treatment (PT2) effected in another suitable apparatus (for example a centrifuge decanter (S2)), with a fresh fluxing agent (F2), separating it into a liquid (L2), the intermediate clarified product, which is recycled and used, possibly after the addition of further fresh fluxing agent, such as the fluxing agent (F1) in the first step, and into a phase rich in solids (P2).

As shown in FIG. 3, in multistep treatment fluxing agent and bitumen mixture relative flows are predominantly countercurrent.

Some examples carried out on a material produced from a hydrotreatment pilot plant in slurry phase, having an organic content higher than 80% wt, are provided for a better illustration of the invention.

These examples should not be considered as limiting the scope of the invention.

Example 1

10 g of purge from a hydrotreatment plant in slurry phase are subjected to metal solubilization treatment in an alkaline solution, carried out under the following conditions:

Concentration of sample in the alkaline solution: 50 g/l
NaOH: 0.6 g/g sample
Temperature: 80° C.
Presence of oxygen
Stirrer rate: 600 rpm
At the end of the treatment, the leaching yields in the metals obtained were negligible (<5%).

Example 2

Example 2 was carried out under the same conditions as Example 1, adding naphthenic acid to the dispersion in order to improve the wettability of the solid.

The yields are much higher, as indicated in Table 1.

Example 3

A sample of the same material is dispersed in Light Cycle Oil (LCO) with weight ratios of 1:2 (sample:LCO) and the resulting dispersion is filtered in a 0.5 micron bomb filter under nitrogen pressure.

The resulting panel, not washed and still containing hydrocarbons, is subjected to drying at 170° C. for 8 hours in an inert environment to remove the light organic components.

The end-product, subjected to the same leaching treatment described in Example 1, shows an increase in the recovery degree of the metals, as shown in Table 1.

Example 4

A cake obtained as described in Example 3, not dried, is dispersed a second time with LCO, in a weight ratio of 1:5.

The dispersion is again filtered with the same procedure followed in Example 3.

The resulting panel is dried at 280° C. in an inert environment and subjected to the same leaching treatment described in Example 1.

The leaching yields are indicated in Table 1.

Example 5

A cake as in Example 3, not dried, is treated with tetrahydrofuran (THF) in a ratio of 1:10, filtered and then dried at 100° C. in an inert environment.

The final dried product is subjected to leaching as in Example 1; the results are indicated in Table 1.

Example 6

A cake as in Example 3, not dried, is treated with toluene in a ratio of 1:10, filtered and then dried at 100° C.

The final dried product is treated as described in Example 1; the results are indicated in Table 1.

Example 7

10 g of the same starting material as Example 1 are treated with THF in a ratio of 1:40. The dispersion is filtered as in Example 3 and the panel dried at 100° C. and then subjected to leaching under the same conditions as Example 1.

The yields are indicated in Table 1.

Example 8

10 g of the same starting material are treated with N-methyl-2-pyrrolidone in a ratio of 1:10.

The slurry is filtered, dried at 170° C. in an inert environment and then subjected to leaching as in Example 1.

The results are indicated in Table 1.

TABLE 1

|         | Leaching yield | |
| --- | --- | --- |
| Example | Mo | V |
| 1 | <5% | <5% |
| 2 | 15% | 25% |
| 3 | 38% | 41% |
| 4 | 75% | 88% |
| 5 | 80% | 87% |
| 6 | 55% | 71% |
| 7 | 97% | 94% |
| 8 | 94% | 95% |

The invention claimed is:

1. A process for recovering metals from a stream comprising hydrocarbons and carbonaceous residues, the process comprising:
   (a) sending said stream for extraction by mixing said stream with a hydrophilizing agent capable of removing hydrophobic species of said stream;
   (b) sending the mixture from (a) and said hydrophilizing agent for separation, thereby separating a liquid phase containing most of the hydrophilizing agent and hydrocarbons dissolved from a solid phase;
   (c) optionally, subjecting the separated solid phase from (b) to drying at a maximum temperature of 350° C., thereby removing medium-light hydrocarbon components from the solid phase;
   (d) sending the separated solid phase from (b), optionally dried in (c), for leaching with an alkaline metal in solution, air and/or oxygen and an emulsifying agent or its precursor;
   (e) sending a leached mixture from (d) for separation, thereby separating a solid residue from liquor,
   wherein the stream is fed, before being sent for the extraction (a), to a primary treatment, carried out in one or more steps, wherein said stream is mixed with a fluxing agent and treated in an apparatus at a temperature of from 80 to 180° C. and subjected to liquid/solid separation, thereby obtaining a clarified product consisting essentially of liquids and a phase comprising solids which is then sent to the extraction (a).

2. The process according to claim 1, wherein the primary treatment is conducted at a temperature of from 100 to 160° C.

3. The process according to claim 1, wherein the primary treatment is conducted in a single step in which the fluxing agent is cocurrent with respect to the stream to be treated.

4. The process according to claim 1, wherein the primary treatment is conducted in two or more steps in which the fluxing agent is in countercurrent with respect to the stream to be treated, wherein in each step, the solid is separated and sent for subsequent step of the treatment, and the liquid is separated and recycled, as the fluxing agent, to the previous step of the treatment.

5. The process according to claim 1, wherein the drying of the solid phase (c) is carried out by moving said solid phase under heat and in an inert atmosphere, at a temperature up to 350° C. and pressure of 1 bar or under vacuum up to 0.05 bar.

6. The process according to claim 1, wherein the drying of the solid phase (c) is carried out by flushing of inert gas.

7. The process according to claim 1, wherein the liquid phase containing most of the hydrophilizing agent and dissolved hydrocarbons is subjected to separation, thereby separating the hydrophilizing agent, which is then recycled to the extraction (a), from the hydrocarbons.

8. The process according to claim 1, wherein the leaching (d) is carried out at a temperature of from 50 to 250° C. and pressure of from atmospheric pressure to 100 bar.

9. The process according to claim 1, wherein the alkaline metal in solution is selected from the group consisting of sodium and potassium, and a concentration of the metal in solution is from 0.3 to 2 g/g of sample.

10. The process according to claim 1, wherein the leaching (d) is carried out in the presence of a dispersant or its precursor.

11. The process according to claim 1, wherein the drying (c) is carried out and vapors leaving the drying (c) are condensed and recycled to the extraction (a).

12. The process according to claim 1, wherein the hydrophilizing agent is at least partially soluble in aqueous phase.

13. The process according to claim 1, wherein the separations are conducted in at least one apparatus selected from the group consisting of a filter-press, a centrifuge, a centrifugal decanter, and a hydrocyclone.

* * * * *